(12) United States Patent
Blizzard

(10) Patent No.: US 12,185,695 B2
(45) Date of Patent: *Jan. 7, 2025

(54) PRESSURE-APPLYING GARMENT FOR ANIMALS

(71) Applicant: Thundershirt, LLC, Durham, NC (US)

(72) Inventor: Philip J. Blizzard, Durham, NC (US)

(73) Assignee: Thundershirt, LLC, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/514,303

(22) Filed: Jul. 17, 2019

(65) Prior Publication Data

US 2019/0335711 A1 Nov. 7, 2019

Related U.S. Application Data

(63) Continuation of application No. 14/557,028, filed on Dec. 1, 2014, now abandoned, which is a continuation
(Continued)

(51) Int. Cl.
*A01K 13/00* (2006.01)
*A01K 15/00* (2006.01)
(Continued)

(52) U.S. Cl.
CPC ............ *A01K 15/00* (2013.01); *A01K 13/006* (2013.01); *A01K 15/02* (2013.01); *A01K 29/00* (2013.01); *A61D 9/00* (2013.01)

(58) Field of Classification Search
CPC .... A01K 13/006; A01K 13/008; A01K 29/00; A01K 13/00; A01K 15/00; A01K 15/02;
(Continued)

(56) References Cited

U.S. PATENT DOCUMENTS 58,081 A 9/1866 Elveena
2,131,495 A 9/1938 Allen
(Continued)

FOREIGN PATENT DOCUMENTS

AU 2010260315 A1 1/2012
AU 2016203477 B2 6/2018
(Continued)

OTHER PUBLICATIONS

Machine translation of JP 2008178332 to Ito, published Aug. 2008.*
(Continued)

*Primary Examiner* — Morgan T Jordan
(74) *Attorney, Agent, or Firm* — Moore & Van Allen PLLC; Jeffrey R. Gray

(57) ABSTRACT

An animal garment comprises a central portion having a longitudinal axis and including a front end, and a rear end opposite the front end, a first side extending laterally in a first direction from the longitudinal axis, the first side including a free distal end, and a second side extending laterally in a second direction from the longitudinal axis, the second side including a free distal end. When worn, the first side and the second side are configured to extend around the mid-body of the animal and fasten to each other forming a shape conforming to the outside of the mid-body of the animal. The front end of the central portion is positioned proximate to the head of the animal. The garment applies pressure to the animal adequate to reduce anxiety, fearfulness, overexcitement, or a combination thereof in the animal.

23 Claims, 7 Drawing Sheets

Related U.S. Application Data of application No. 13/896,843, filed on May 17, 2013, now Pat. No. 8,899,189, which is a continuation of application No. 13/657,364, filed on Oct. 22, 2012, now Pat. No. 8,459,211, which is a continuation of application No. 12/769,735, filed on Apr. 29, 2010, now Pat. No. 8,291,867.

(60) Provisional application No. 61/218,620, filed on Jun. 19, 2009.

(51) Int. Cl.
  *A01K 15/02* (2006.01)
  *A01K 29/00* (2006.01)
  *A61D 9/00* (2006.01)

(58) Field of Classification Search
  CPC ..... A01K 27/002; A61D 9/00; A61F 13/0273; A61F 2013/00119; A61F 2013/0028; A61F 13/00038; B68C 5/00; A41B 13/06; Y10S 2/912; Y10S 2/908
  See application file for complete search history.

(56) References Cited

U.S. PATENT DOCUMENTS

| | | | |
|---|---|---|---|
| D177,490 S | 4/1956 | Bacon | |
| D228,926 S | 10/1973 | Bennett | |
| 4,385,592 A | 5/1983 | Goldstein | |
| 4,489,676 A | 12/1984 | Colquist | |
| D281,028 S | 10/1985 | Nichols | |
| 4,577,591 A | 3/1986 | Wesseldine | |
| 4,654,246 A | 3/1987 | Provost et al. | |
| 4,715,618 A | 12/1987 | Harris | |
| 4,843,641 A * | 7/1989 | Cusick | G21F 3/03 2/457 |
| 4,872,215 A * | 10/1989 | Sliger | A63B 71/12 2/92 |
| 4,955,182 A | 9/1990 | Newman | |
| D312,151 S | 11/1990 | Dickey | |
| D313,291 S | 12/1990 | Shanley | |
| D313,676 S | 1/1991 | Indursky et al. | |
| 5,060,458 A | 10/1991 | Curtis | |
| D329,927 S | 9/1992 | Thomas | |
| 5,359,963 A | 11/1994 | Jesse et al. | |
| 5,370,113 A | 12/1994 | Parsons | |
| 5,425,702 A * | 6/1995 | Carn | A61F 13/146 602/76 |
| 5,632,235 A * | 5/1997 | Larsen | A01K 27/002 119/856 |
| D379,686 S | 6/1997 | Caditz | |
| 5,913,285 A | 6/1999 | Pritchard | |
| 5,941,199 A | 8/1999 | Tamura | |
| 5,996,537 A | 12/1999 | Caditz | |
| 6,000,366 A | 12/1999 | Reeping | |
| D427,734 S | 7/2000 | Balzarini | |
| 6,123,049 A | 9/2000 | Slater | |
| 6,138,611 A | 10/2000 | Thielemann | |
| 6,234,117 B1 * | 5/2001 | Spatt | A01K 13/006 119/850 |
| D445,547 S | 7/2001 | Howitz et al. | |
| D453,594 S | 2/2002 | Ishihara | |
| D455,873 S | 4/2002 | Constans | |
| 6,390,026 B1 | 5/2002 | Sollock | |
| 6,443,101 B1 | 9/2002 | Fazio | |
| 6,481,383 B1 | 11/2002 | Ross et al. | |
| D470,275 S | 2/2003 | Lidis | |
| 6,545,193 B1 | 4/2003 | Morgenstern | |
| 6,584,939 B1 | 7/2003 | Brezinski | |
| 6,662,390 B1 * | 12/2003 | Berger | A41B 13/06 2/69 |
| 6,662,754 B1 | 12/2003 | Wilson | |
| D486,275 S | 2/2004 | Grubb | |
| 6,820,574 B2 | 11/2004 | Sharpe | |
| 7,004,922 B1 * | 2/2006 | Shesol | A01K 13/006 119/856 |
| 7,121,231 B2 * | 10/2006 | Benefiel | A01K 13/006 119/850 |
| 7,131,399 B2 | 11/2006 | Blommel | |
| 7,131,400 B2 | 11/2006 | Wanveer et al. | |
| 7,281,363 B2 | 10/2007 | Woerner | |
| D584,862 S | 1/2009 | Kemper | |
| 7,665,425 B2 | 2/2010 | Gross | |
| 7,793,619 B2 | 9/2010 | Kajanoff | |
| D633,257 S | 2/2011 | Trias | |
| 7,918,192 B1 | 4/2011 | Digh et al. | |
| D651,364 S | 12/2011 | Luckenbach | |
| D652,580 S | 1/2012 | Leonard | |
| D653,410 S | 1/2012 | Morton | |
| 8,132,544 B2 | 3/2012 | Kosanke | |
| 8,191,188 B2 * | 6/2012 | Kaplan | A47D 15/008 5/485 |
| D664,310 S | 7/2012 | Ito | |
| D664,720 S | 7/2012 | Leonard | |
| 8,291,867 B2 | 10/2012 | Blizzard | |
| 8,302,565 B2 | 11/2012 | Williams | |
| D677,020 S | 2/2013 | Blizzard | |
| D683,083 S | 5/2013 | Blizzard | |
| 8,459,211 B2 | 6/2013 | Blizzard | |
| 8,539,620 B1 * | 9/2013 | Wynh | A41B 13/06 5/494 |
| 8,782,831 B2 * | 7/2014 | Houston | A41B 13/06 5/494 |
| 8,898,833 B2 * | 12/2014 | Coates | A41B 13/06 5/413 R |
| 8,899,189 B2 | 12/2014 | Blizzard | |
| 9,072,278 B2 * | 7/2015 | Chortyk-White | A01K 13/006 |
| 10,070,621 B1 * | 9/2018 | Hacham David | A01K 27/009 |
| 11,344,396 B2 * | 5/2022 | Levine | A61D 3/00 |
| 2002/0053324 A1 | 5/2002 | Kato | |
| 2002/0121247 A1 * | 9/2002 | Sharpe | A61H 39/04 119/820 |
| 2003/0066495 A1 | 4/2003 | Soares et al. | |
| 2003/0079695 A1 | 5/2003 | Kerrigan | |
| 2004/0074450 A1 | 4/2004 | Soares et al. | |
| 2004/0216230 A1 * | 11/2004 | Blackburn | A41B 13/06 5/482 |
| 2005/0072377 A1 | 4/2005 | Wanveer et al. | |
| 2005/0229869 A1 | 10/2005 | Leo | |
| 2005/0284418 A1 | 12/2005 | Benefiel | |
| 2006/0065210 A1 | 3/2006 | Tozawa | |
| 2006/0156997 A1 | 7/2006 | Moore | |
| 2007/0044735 A1 | 3/2007 | Zimmerman | |
| 2007/0204808 A1 | 9/2007 | Harada | |
| 2007/0289558 A1 | 12/2007 | Bonfoey | |
| 2008/0067163 A1 * | 3/2008 | Axinte | A01K 13/008 219/211 |
| 2008/0086064 A1 | 4/2008 | Rembrand et al. | |
| 2008/0121192 A1 | 5/2008 | Moy | |
| 2008/0134991 A1 | 6/2008 | Depass | |
| 2008/0276880 A1 * | 11/2008 | Swisher | A01K 27/002 119/728 |
| 2009/0070914 A1 | 3/2009 | Landeck et al. | |
| 2009/0120377 A1 | 5/2009 | Palmer | |
| 2009/0178628 A1 | 7/2009 | Carmean et al. | |
| 2009/0183692 A1 | 7/2009 | Rossi et al. | |
| 2009/0308330 A1 | 12/2009 | Kajanoff | |
| 2010/0050958 A1 | 3/2010 | Jackson et al. | |
| 2010/0263602 A1 | 10/2010 | Cho | |
| 2010/0319632 A1 | 12/2010 | Blizzard | |
| 2011/0146585 A1 | 6/2011 | Tenenbaum | |
| 2011/0155077 A1 | 6/2011 | Hurwitz | |
| 2011/0192357 A1 | 8/2011 | Pellegrini | |
| 2011/0226193 A1 | 9/2011 | Williams | |
| 2011/0231993 A1 * | 9/2011 | Schmid | A41B 13/06 5/494 |
| 2012/0174875 A1 | 7/2012 | Wetzel | |
| 2012/0210951 A1 | 8/2012 | Leonard | |
| 2013/0042386 A1 * | 2/2013 | Montgomery | A47D 15/008 2/102 |
| 2013/0042820 A1 | 2/2013 | Blizzard | |
| 2013/0186348 A1 | 7/2013 | Blizzard | |

(56) References Cited

U.S. PATENT DOCUMENTS

| | | | |
|---|---|---|---|
| 2013/0247840 A1 | 9/2013 | Blizzard | |
| 2015/0083054 A1 | 3/2015 | Blizzard | |
| 2019/0297845 A1 | 10/2019 | Gilbert | |
| 2020/0217622 A1* | 7/2020 | James | A45C 3/001 |

FOREIGN PATENT DOCUMENTS

| | | | | |
|---|---|---|---|---|
| BR | PI1011602 B1 | | 7/2018 | |
| CA | 2765747 C | | 2/2016 | |
| CN | 201197309 Y | * | 2/2009 | ............ A01K 13/00 |
| CN | 102802406 B | | 9/2015 | |
| DE | 29718036 U1 | | 1/1998 | |
| EP | 1366658 A1 | | 12/2003 | |
| EP | 2442638 B1 | | 3/2015 | |
| EP | 2904899 B1 | | 10/2017 | |
| FR | 2577382 A1 | | 8/1986 | |
| GB | 2039704 A | * | 8/1980 | ........... A01K 13/006 |
| GB | 1579800 A | | 11/1980 | |
| JP | S63199552 U | | 12/1988 | |
| JP | 2005527225 A | | 9/2005 | |
| JP | 2006211933 A | | 8/2006 | |
| JP | 2006525020 A | | 11/2006 | |
| JP | 2007330106 A | | 12/2007 | |
| JP | 2008118938 A | | 5/2008 | |
| JP | 2008178332 A | * | 8/2008 | ............ A01K 13/00 |
| JP | 2009089607 A | | 4/2009 | |
| JP | 5384736 B2 | | 1/2014 | |
| JP | 6106060 B2 | | 3/2017 | |
| WO | 02067807 A2 | | 9/2002 | |
| WO | 2010147890 A2 | | 12/2010 | |

OTHER PUBLICATIONS

Blizzard, Philip; Applicant Initiated Interview Summary for U.S. Appl. No. 12/769,735, filed Apr. 29, 2010, mailed May 14, 2012, 4 pgs.
Blizzard, Philip; Applicant Initiated Interview Summary for U.S. Appl. No. 12/769,735, filed Apr. 29, 2010, mailed Aug. 22, 2012, 3 pgs.
Blizzard, Philip; Final Office Action for U.S. Appl. No. 12/769,735, filed Apr. 29, 2010, mailed Jul. 3, 2012, 22 pgs.
Blizzard, Philip; Issue Notification for U.S. Appl. No. 12/769,735, filed Apr. 29, 2010, mailed Oct. 3, 2012, 1 pg.
Blizzard, Philip; Non-Final Office Action for U.S. Appl. No. 12/769,735, filed Apr. 29, 2010, mailed Jan. 5, 2012, 14 pgs.
Blizzard, Philip; Notice of Allowance for U.S. Appl. No. 12/769,735, filed Apr. 29, 2010, mailed Sep. 4, 2012, 5 pgs.
Blizzard, Philip; Restriction Requirement for U.S. Appl. No. 12/769,735, filed Apr. 29, 2010, mailed Oct. 27, 2011, 5 pgs.
Blizzard, Philip; Non-Final Office Action for U.S. Appl. No. 13/657,364, filed Oct. 22, 2012, mailed Feb. 11, 2013, 10 pgs.
Blizzard, Philip; Notice of Allowance for U.S. Appl. No. 13/657,364, filed Oct. 22, 2012, mailed Apr. 23, 2013, 9 pgs.
Blizzard, Philip; Applicant Initiated Interview Summary for U.S. Appl. No. 13/657,364, filed Oct. 22, 2012, mailed Mar. 25, 2013, 3 pgs.
Blizzard, Philip; Issue Notification for U.S. Appl. No. 13/657,364, filed Oct. 22, 2012, mailed May 22, 2013, 1 pg.
Blizzard, Philip; Advisory Action for U.S. Appl. No. 13/896,843, filed May 17, 2013, mailed May 21, 2014, 3 pgs.
Blizzard, Philip; Final Office Action for U.S. Appl. No. 13/896,843, filed May 17, 2013, mailed Mar. 6, 2014, 32 pgs.
Blizzard, Philip; Issue Notification for U.S. Appl. No. 13/896,843, filed May 17, 2013, mailed Nov. 12, 2014, 1 pg.
Blizzard, Philip; Non-Final Office Action for U.S. Appl. No. 13/896,843, filed May 17, 2013, mailed Aug. 7, 2013, 19 pgs.
Blizzard, Philip; Notice of Allowance for U.S. Appl. No. 13/896,843, filed May 17, 2013, mailed Jul. 30, 2014, 09 pgs.
Blizzard, Philip; Notice of Allowance for U.S. Appl. No. 13/896,843, filed May 17, 2013, mailed Sep. 29, 2014, 2 pgs.
Blizzard, Philip; Notice of Allowance for U.S. Appl. No. 13/896,843, filed May 17, 2013, mailed Oct. 10, 2014, 2 pgs.
Blizzard, Philip; Final Office Action for U.S. Appl. No. 14/557,028, filed Dec. 1, 2014, mailed May 23, 2016, 19 pgs.
Blizzard, Philip; Final Office Action for U.S. Appl. No. 14/557,028, filed Dec. 1, 2014, mailed Nov. 23, 2018, 16 pgs.
Blizzard, Philip; Non-Final Office Action for U.S. Appl. No. 14/557,028, filed Dec. 1, 2014, mailed Aug. 11, 2015, 20 ogs.
Blizzard, Philip; Decission to Grant for serial No. 2010260315, filed Jun. 14, 2010, mailed Sep. 22, 2016, 1 pg.
Blizzard, Philip; Notice of Acceptance for serial No. 2010260315, filed Jun. 14, 2010, mailed May 31, 2016, 2 pgs.
Blizzard, Philip; Notification to Grant for serial No. 201080036554.7, filed on Jun. 14, 2010, mailed Jun. 11, 2015, 3 bgs (2 pgs of English Translation and 1 pg of Official copy).
Blizzard, Philip; Office Action for serial No. 201080036554.7, filed Jun. 14, 2010, mailed Jun. 19, 2013, 22 pgs (14 pgs of English Translation and 8 pgs of Official copy).
Blizzard, Philip; Office Action for serial No. 201080036554.7, filed Jun. 14, 2010, mailed Jul. 9, 2014, 21 pgs (13 pgs of English Translation and 8 pgs of Official copy).
Blizzard, Philip; Decision to Grant for serial No. 10728971.2, filed Jun. 14, 2010, mailed Feb. 26, 2015, 2 pgs.
Blizzard, Philip; Intention to Grant for serial No. 10728971.2, filed Jun. 14, 2010, mailed Oct. 13, 2014, 7 pgs.
Blizzard, Philip; Decision to Grant for serial No. 15160567.2, filed Jun. 14, 2010, mailed on Sep. 21, 2017, 2 pgs.
Blizzard, Philip; Intention to Grant for serial No. 15160567.2, filed Jun. 14, 2010, mailed on May 4, 2017 , 7 pgs.
Blizzard, Philip; Decision to Grant for serial No. 2012-516166, filed Jun. 14, 2010, mailed Sep. 2, 2013, 06 pgs (3 pgs of English Translation and 3 pgs of Official copy).
Blizzard, Philip; Search Report for serial No. 2012-516166, filed Jun. 14, 2010, mailed Aug. 29, 2013, 32 pgs (18 pgs of English Translation and 14 pgs of Official copy).
Blizzard, Philip; Decision to Grant for serial No. 2013-207195, filed Jun. 14, 2010, mailed Feb. 6, 2017, 5 pgs (2 pages of English Translation and 3 pages of Official copy).
Blizzard, Philip; Office Action for serial No. 2013-207195, filed Jun. 14, 2010, mailed Jun. 16, 2014, 4 pgs (2 pgs of English Translation and 2 pgs of Official copy).
Blizzard, Philip; Office Action for serial No. 2013-207195, filed Jun. 14, 2010, mailed Jul. 19, 2016, 5 pgs (2 pages of English Translation and 3 pages of Official copy).
Blizzard, Philip; Search Report for serial No. 2013-207195, filed Jun. 14, 2010, mailed Jun. 11, 2014, 21 pgs (12 pgs of English Translation and 9 pgs of Official copy).
Blizzard, Philip; Issue Notification for U.S. Appl. No. 29/424,307, filed Jun. 11, 2012, mailed Feb. 6, 2013, 1 pg.
Blizzard, Philip; Notice of Allowance for U.S. Appl. No. 29/424,307, filed Jun. 11, 2012, mailed Nov. 27, 2012, 11 pgs.
Blizzard, Philip; Notice of Allowance for U.S. Appl. No. 29/424,308, filed Jun. 11, 2012, mailed Jan. 15, 2013, 5 pgs.
Blizzard, Philip; Issue Notification for U.S. Appl. No. 29/424,308, filed Jun. 11, 2012, mailed May 1, 2013, 1 pg.
Blizzard, Philip; Non-Final Office Action for U.S. Appl. No. 29/424,308, filed Jun. 11, 2012, mailed Dec. 17, 2012, 8 pgs.
Paws Aboard Inc .; Paws Aboard Doggy Life Jacket and Designed Doggy Life Jackets, http://www.pawsaboard.com/dog-lifejacket-pet-life-jacket-asp, visited Jan. 30, 2009, 3 pages.
Thundershirt LLC, International Search Report and Written Opinion for International Application No. PCT/US2013/021913 dated Sep. 9, 2014, 9 pages.
Thundershirt LLC, International Preliminary Report on Patentability for International Application No. PCT/US2013/021913 dated Sep. 23, 2014, 6 pages.
Thundershirt LLC, International Search Report and Written Opinion for International Application No. PCT/US2010/038501 dated Mar. 22, 2011, 11 pages.
Thundershirt LLC, International Preliminary Report on Patentability for International Application No. PCT/US2010/038501 dated Dec. 20, 2011, 6 pages.

(56) References Cited

OTHER PUBLICATIONS

Thundershirt, LLC, Office Action for Australian Patent Application No. 2010260315 dated Aug. 26, 2014, 5 pages.
Thundershirt, LLC, Notice of Acceptance for Australian Application No. 2016203477, filed May 26, 2016, mailed Jun. 4, 2018, 3 pgs.
Thundershirt, LLC, Certificate of Grant for Australian Patent No. 2016203477, filed May 26, 2016, mailed Sep. 27, 2018, 1 pg.
Thundershirt, LLC, Office Action for Australian Patent Application No. 2016203477 dated Jul. 4, 2017, 3 pages.
Thundershirt, LLC, Patent Examination Report for Australian Patent Application No. 2010260315 dated May 20, 2016, 6 pages.
Thundershirt, LLC, Office Action for Brazilian Application No. PI 1011602-8 dated Sep. 12, 2017, 12 pages.
Thundershirt, LLC, Office Action for Brazilian Application No. PI 1011602-8 dated Dec. 29, 2017, 7 pages.
Thundershirt, LLC, Nullity Report for Brazilian Application No. BR302012003641-0, dated Jun. 29, 2015, 1 page.
Thundershirt, LLC, Office Action for Brazilian Application No. BR302012003641-0, dated May 8, 2017, 8 pages.
Thundershirt, LLC, Office Action for Canadian Patent Application No. 2,765,747 dated Jun. 5, 2014, 2 pages.
Thundershirt, LLC, Office Action for Chinese Patent Application No. 201080036554.7 dated Apr. 1, 2014, 25 pages.
Thundershirt, LLC, Office Action for Chinese Patent Application No. 201080036554.7 dated Feb. 27, 2015.
Thundershirt, LLC, Extended European Search Report for European Application No. 15160567.2 dated Jul. 3, 2015.
Thundershirt, LLC, Office Action for European Application No. 15160567.2 dated Jun. 30, 2016, 3 pages.
Thundershirt, LLC, Examination Report for European Application No. 10728971.2 dated Nov. 30, 2012, 4 pages.
Thundershirt, LLC, Office Action for European Application No. 10728971.2 dated Sep. 19, 2013, 4 pages.
Thundershirt, LLC, Notification of Reason for Rejection for Japanese Application No. 2013-207195 dated Aug. 17, 2015, 5 pages.
Thundershirt, LLC, Office Action for Mexican Application No. MX/a/2011/013945, Apr. 11, 2014, 1 page.
USPTO; Office Action for U.S. Appl. No. 13/355,090 dated Feb. 25, 2014, 6 pages.
USPTO; Office Action for U.S. Appl. No. 13/355,090 dated May 22, 2014, 20 pages.
USPTO; Office Action for U.S. Appl. No. 13/355,090 dated Jan. 13, 2015, 10 pages.
USPTO; Office Action for U.S. Appl. No. 16/697,788 dated Sep. 3, 2020, 21 pages.
USPTO; Office Action for U.S. Appl. No. 15/273,320 dated Jul. 28, 2017, 21 pages.
USPTO; Final Office Action for U.S. Appl. No. 15/273,320 dated May 3, 2018, 11 pages.
USPTO; Office Action for U.S. Appl. No. 15/273,320 dated Jan. 30, 2020, 9 pages.
USPTO; Office Action for U.S. Appl. No. 14/557,028 dated Aug. 11, 2015, 20 pages.
USPTO; Office Action for U.S. Appl. No. 14/557,028 dated May 23, 2016, 19 pages.
USPTO; Final Office Action for U.S. Appl. No. 14/557,028 dated Nov. 23, 2018, 16 pages.

* cited by examiner

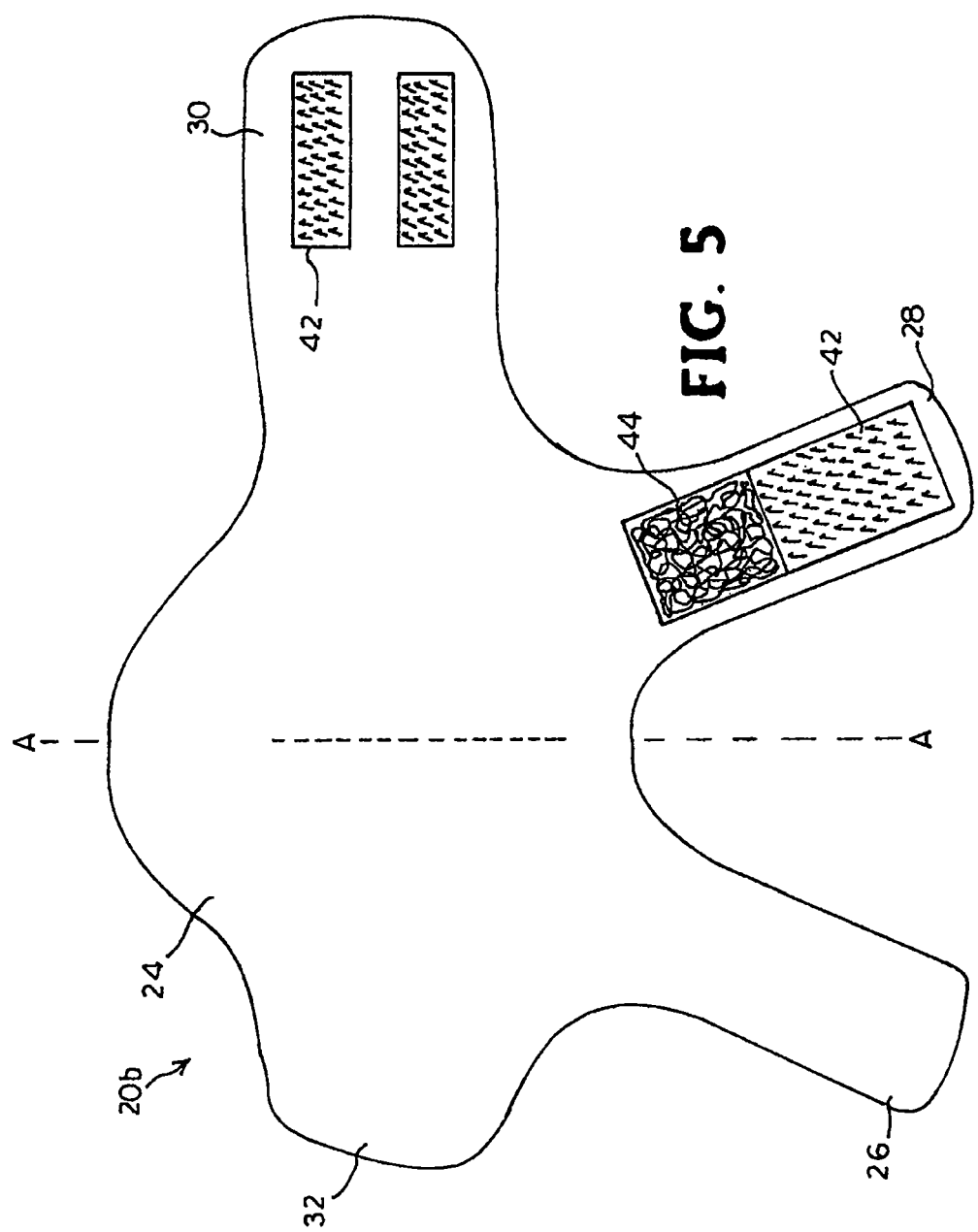

PRESSURE-APPLYING GARMENT FOR ANIMALS

CROSS-REFERENCE TO RELATED APPLICATIONS

This application is a continuation of U.S. patent application Ser. No. 14/557,028, filed Dec. 1, 2014, currently pending, which is a continuation of U.S. application Ser. No. 13/896,843, filed May 17, 2013, now U.S. Pat. No. 8,899,189, which is a continuation of U.S. patent application Ser. No. 13/657,364, now U.S. Pat. No. 8,459,211, filed Oct. 22, 2012, which is a continuation of U.S. patent application Ser. No. 12/769,735, filed Apr. 29, 2010, now U.S. Pat. No. 8,291,867, which claims the benefit of U.S. Provisional Application No. 61/218,620, filed Jun. 19, 2009, the contents of all of which are hereby incorporated by reference in their entirety.

BACKGROUND

Animals may suffer from various types of anxiety, fearfulness, or overexcitement. Such feelings or behaviors are common problems for dogs, for example, and can present many symptoms and severity levels. On the less extreme end of the spectrum, a fear of thunder may cause the dog to shake and cling to her owner. On the other extreme, the fear may cause panicked running, destructive chewing, defecating indoors, seizures, or other erratic behavior. Additional known symptoms include panting, drooling, whining, barking, hiding, seeking tight spaces, trembling, scratching, not eating, and pacing. Some owners are not aware that negative behavior they are seeing is actually caused by anxiety. In addition to noises, other sources of anxiety may include separation from owner(s), travel, crating, strangers, other dogs, and much more.

Determining what causes a dog's anxiety may be difficult or impossible to pinpoint. The start of the anxiety may in some cases be traced to a traumatic incident such as being too close to a fireworks show or too close to a lightning strike and the subsequent thunder clap. However, a dog may have a genetic predisposition for noise or other types of anxiety. Studies have shown that some breeds, such as Collies, Golden Retrievers, and German Shepherds, have a higher incidence of noise anxiety. For some dogs, noise anxiety gradually appears and worsens as they age for no apparent reason, while for others, noise anxiety appears as a puppy and stays with them.

There are several known treatments to consider for giving relief to a dog from anxiety. For example, for noise anxiety, the owner may change the dog's environment with "common sense" attempts to give the dog comfort. Efforts may include creating a safe haven for the dog, such as a blanket-covered crate, finding a location that will reduce the noise level, or turning on music or the television to help mask the sound of the problem noise. These efforts, however, typically do not show dramatic results, but they can help to reduce symptoms.

A second treatment approach is behavior modification. For example, desensitization is one of the most common behavior modifications tried for noise anxiety. In a controlled environment, the dog is exposed to a low level of the noise. As she becomes accustomed to the noise, the volume is increased over time until she learns to tolerate a high level of noise. This approach has limitations in practice; it is very time consuming, in some cases it is not effective because many dogs recognize the difference between artificial and real events, and if it is effective, the dog will likely require ongoing periodic treatments.

A third treatment approach is medication. There are a variety of prescription medications that a veterinarian may suggest. Some are administered on a regular basis for the life of the dog (Paroxetine or Fluoxetine), while others are given only at the time of an anxiety event (valium). Sometimes a combination of drugs is used. Any of these options tend to be relatively expensive when accounting for the veterinarian visits and the drug costs, and the medications pose a risk of unwanted physical side effects that may be severe.

A final form of treatment is a "pressure wrap." A pressure wrap is material that wraps around the dog's torso, in particular the chest and sometimes the stomach, to provide a constant, gentle pressure. It is uncertain why wraps are effective, but anxiety experts such as Dr. Temple Grandin suggest that pressure has a calming effect on the nervous system. Examples of using pressure to calm anxiety include pressure shirts for people with autism, squeeze chutes for cattle, pressure shirts and weighted vests for children with certain behavioral disorders, and swaddling infants. This treatment has been proven very effective for many dogs. Some wraps are homemade, for example, out of an appropriately sized t-shirt, but wraps can be difficult to put on and get the desired fit. Some conventional pressure wraps lack ease in applying the wrap and may be difficult to adjust to the right pressure.

SUMMARY

In accordance with one embodiment, a garment is provided for an animal having a first pair of appendages and a second pair of appendages, and further having a mid-body between the first pair of appendages and the second pair of appendages. The garment includes a central portion, a first flap, and a second flap. The central portion has a longitudinal axis and a front end, a first side extending laterally in a first direction from the longitudinal axis, and a second side extending laterally in a second direction from the longitudinal axis in a direction opposite the first direction. The first flap extends from the first side of the central portion, and the second flap extends from the second side of the central portion. The flaps are adapted to extend around the animal's mid-body and fasten to each other such that the central portion and fastened flaps form a shape conforming to the outside of the animal's mid-body, and the garment applies pressure to the animal adequate to reduce anxiety, fearfulness, overexcitement, or a combination thereof in the animal.

An embodiment may further provide that the central portion has a front end adapted to be positioned proximate to the head of the animal, and a rear end opposite the front end. A pair of straps may extend from the front end of the central portion in spaced relation, and the straps may be adapted to extend around the animal's neck and fasten to each other.

In accordance with another embodiment, a garment is provided for an animal having a first pair of appendages and a second pair of appendages, and further having a mid-body between the first pair of appendages and the second pair of appendages. The garment includes a central portion, a first flap, a second flap, and a cinching member. The central portion has a longitudinal axis and a front end, a first side extending laterally in a first direction from the longitudinal axis, and a second side extending laterally in a second direction from the longitudinal axis in a direction opposite the first direction. The first flap extends from the first side of the central portion, and the second flap extends from the second side of the central portion. The cinching member has a proximate end attached to the central portion, the first flap, or the second flap and extending to a free distal end. The flaps are adapted to extend around the animal's mid-body and fasten to each other such that the central portion and fastened flaps form a shape conforming to the outside of the animal's mid-body to form a sleeve. The cinching member is adapted to extend at least partially around the sleeve and to fasten to the central portion, the first flap, the second flap, or a combination thereof to further tighten the garment to apply pressure to the animal.

In accordance with another embodiment, a garment is provided for an animal having a first pair of appendages and a second pair of appendages, and further having a mid-body between the first pair of appendages and the second pair of appendages. The garment includes a central portion, a first flap, and a second flap. The central portion has a longitudinal axis and a front end, a first side extending laterally in a first direction from the longitudinal axis, and a second side extending laterally in a second direction from the longitudinal axis in a direction opposite the first direction. The first flap extends from the first side of the central portion, and the second flap extends from the second side of the central portion. The flaps are adapted to extend around the animal's mid-body and fasten to each other such that the central portion and fastened flaps form a shape conforming to the outside of the animal's mid-body. The central portion, the first flap, and the second flap are made of a fabric including approximately from 5% to 25% spandex to apply resilient pressure to the animal.

In accordance with another embodiment, a garment is provided for an animal having a first pair of appendages and a second pair of appendages, and further having a mid-body between the first pair of appendages and the second pair of appendages. The garment includes a central portion that has a longitudinal axis and a front end, a first side extending laterally in a first direction from the longitudinal axis, and a second side extending laterally in a second direction from the longitudinal axis in a direction opposite the first direction. Means for operatively connecting the first side and second side of the central portion together around the animal to form a sleeve are also provided. The garment applies pressure to the animal adequate to reduce anxiety, fearfulness, overexcitement, or a combination thereof in the animal.

In accordance with another embodiment, a method of reducing anxiety, fearfulness, overexcitement, or a combination thereof, in an animal is provided. The animal has a first pair of appendages and a second pair of appendages, with a mid-body between the first pair of appendages and the second pair of appendages. The method includes placing a garment on the mid-body of the animal. The garment includes a central portion, a first flap, and a second flap. The central portion has a longitudinal axis and a front end, a first side extending laterally in a first direction from the longitudinal axis, and a second side extending laterally in a second direction from the longitudinal axis in a direction opposite the first direction. The first flap extends from the first side of the central portion, and the second flap extends from the second side of the central portion. The method further includes wrapping the first flap under the animal's chest, stomach, or a combination thereof to overlap the second flap. The first flap is secured to the second flap such that the garment applies pressure to the animal adequate to reduce anxiety, fearfulness, overexcitement, or a combination thereof in the animal.

BRIEF DESCRIPTION OF THE DRAWINGS

For a More Complete Understanding of Embodiments of a Pressure-Applying Garment for Animals and Associated Methods, Reference should Now be had to the Embodiments Shown in the Accompanying Drawings and Described Below. In the Drawings:

FIG. 5 is bottom plan view of the embodiment of FIG. 4.

DESCRIPTION

Certain terminology is used herein for convenience only and is not to be taken as a limitation on the embodiments described. For example, words such as "top", "bottom", "front," "upper," "lower," "left," "right," "horizontal," "vertical," "upward," and "downward" merely describe the configuration shown in the figures. Indeed, the referenced components may be oriented in any direction and the terminology, therefore, should be understood as encompassing such variations unless specified otherwise. Throughout this disclosure, where a process or method is shown or described, the steps of the method may be performed in any order or simultaneously, unless it is clear from the context that one step depends on another being performed first.

Figure 1:
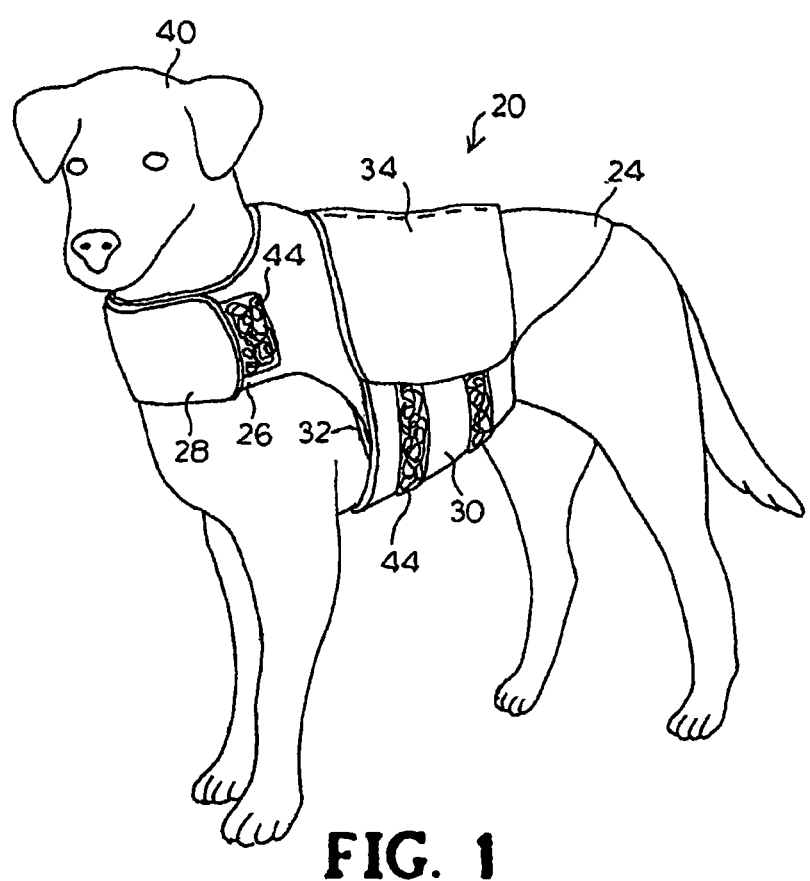
FIG. 1 is a perspective view of one embodiment of a pressure-applying garment as worn by an exemplary animal.
Figure 2:
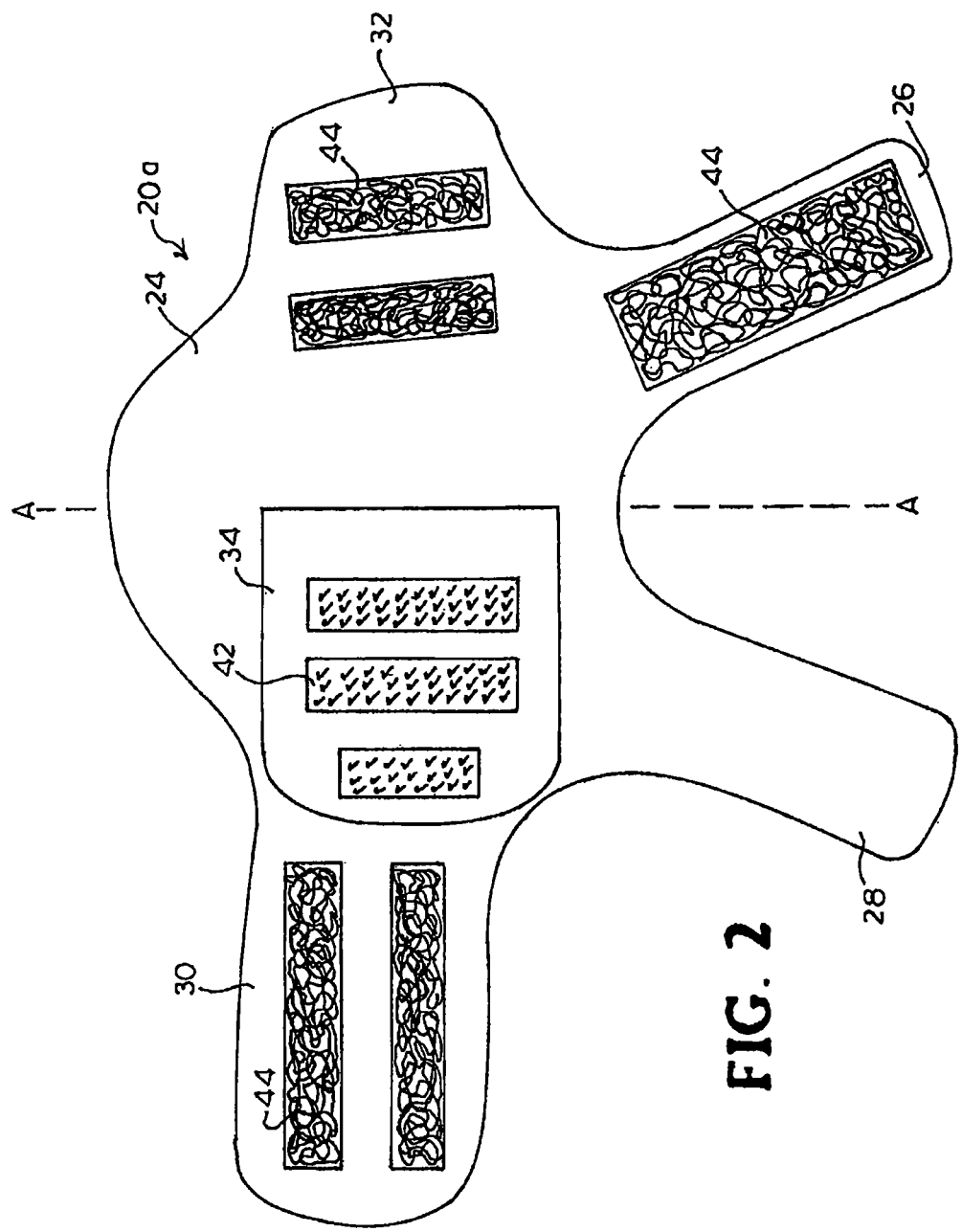
FIG. 2 is a top plan view of a first embodiment of the pressure-applying garment of FIG. 1.
Figure 3:
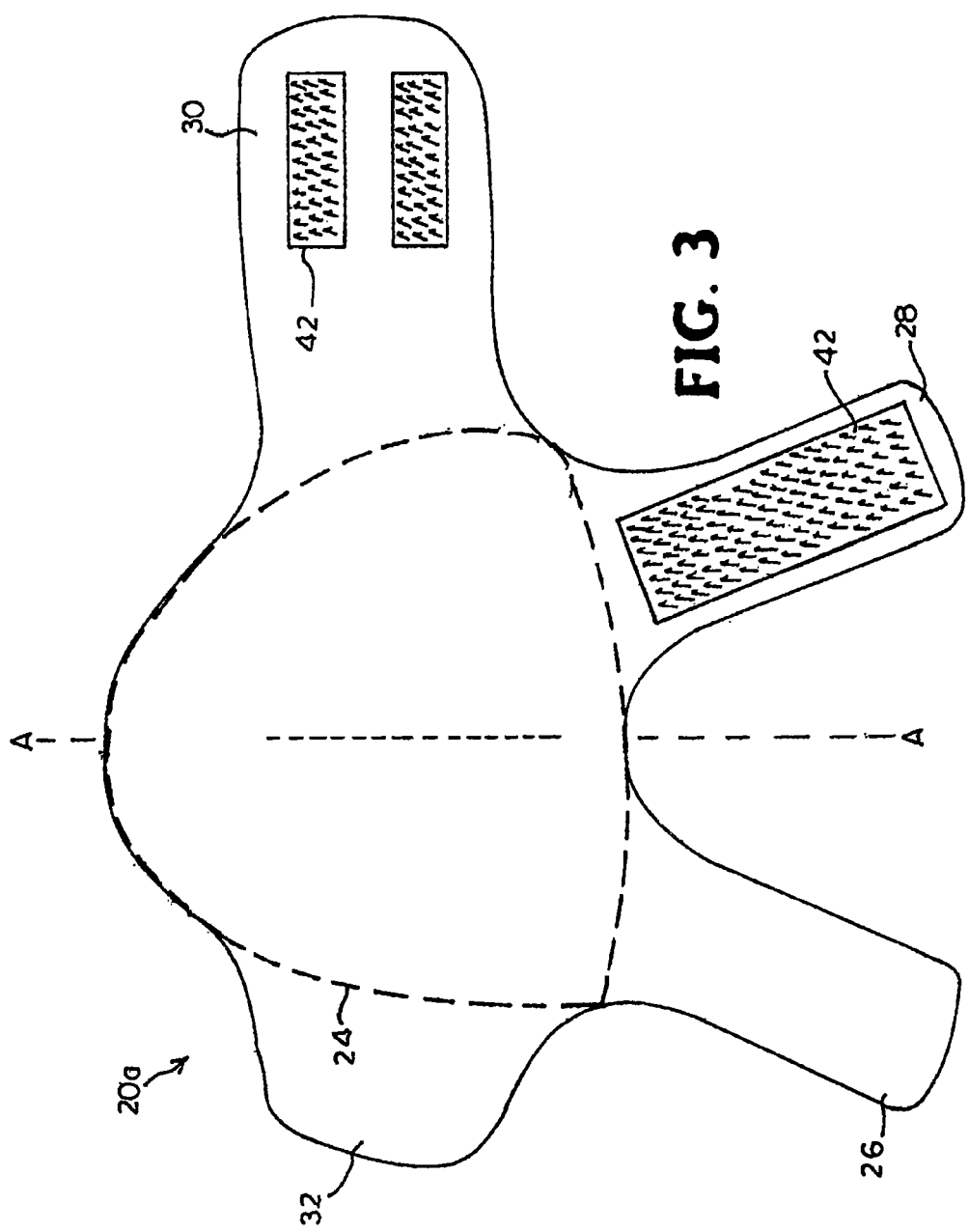
FIG. 3 is bottom plan view of the embodiment of FIG. 2.

Referring now to the drawings, wherein like reference numerals designate corresponding or similar elements throughout the several views, an embodiment of a pressure wrap garment 20 is shown in FIGS. 1-3. Although in FIG. 1 the garment is shown on a dog, the garment 20 may be applied to nearly any type of animal with four legs, or two arms and two legs. For example, in addition to a dog, the garment 20 may be worn by a cat or a monkey. This embodiment of the garment 20, 20a includes a central portion 24 having a longitudinal axis A-A, a left strap 26 and a right strap 28 extending from the front of the central portion 24 approximately parallel to the longitudinal axis A-A, a long flap 30 extending from the right side of the central portion 24 substantially perpendicular to the longitudinal axis A-A, a short flap 32 extending from the left side of the central portion 24 substantially perpendicular to the longitudinal axis A-A, and a top flap or cinching member 34 that is attached to the central portion 24 substantially along a longitudinal axis A-A of the central portion. The top of the garment 20a is shown in FIG. 2, and the bottom of the garment 20a is shown in FIG. 3. As worn by a dog 40, the left strap 26 and the right strap 28 go around the dog's neck and fasten to each other, with the bottom of the right strap 28 going over the top of the left strap 26. The long flap 30 goes around the dog's chest and stomach to fasten to the short flap 32, with the bottom of the long flap 30 going over the top of the short flap 32. The cinching member 34 folds down to fasten to the top of the long flap 30. Alternatively, the cinching member 34 could fold down to fasten to the central portion 24.

In the embodiment shown, hook and loop fasteners, such as Velcro® (VELCRO is a registered trademark of Velcro Industries B.V.), are used to removably attach the parts of the garment to each other. The hook material is designated at 42, and the loop material is designated at 44, but the materials may be switched so long as a hook surface meets a loop surface when the material is brought together. Other fasteners may be used as recognized by one of ordinary skill in the art, such as a series of buttons or snaps, or a combination of webbed straps and clips.

Figure 4:
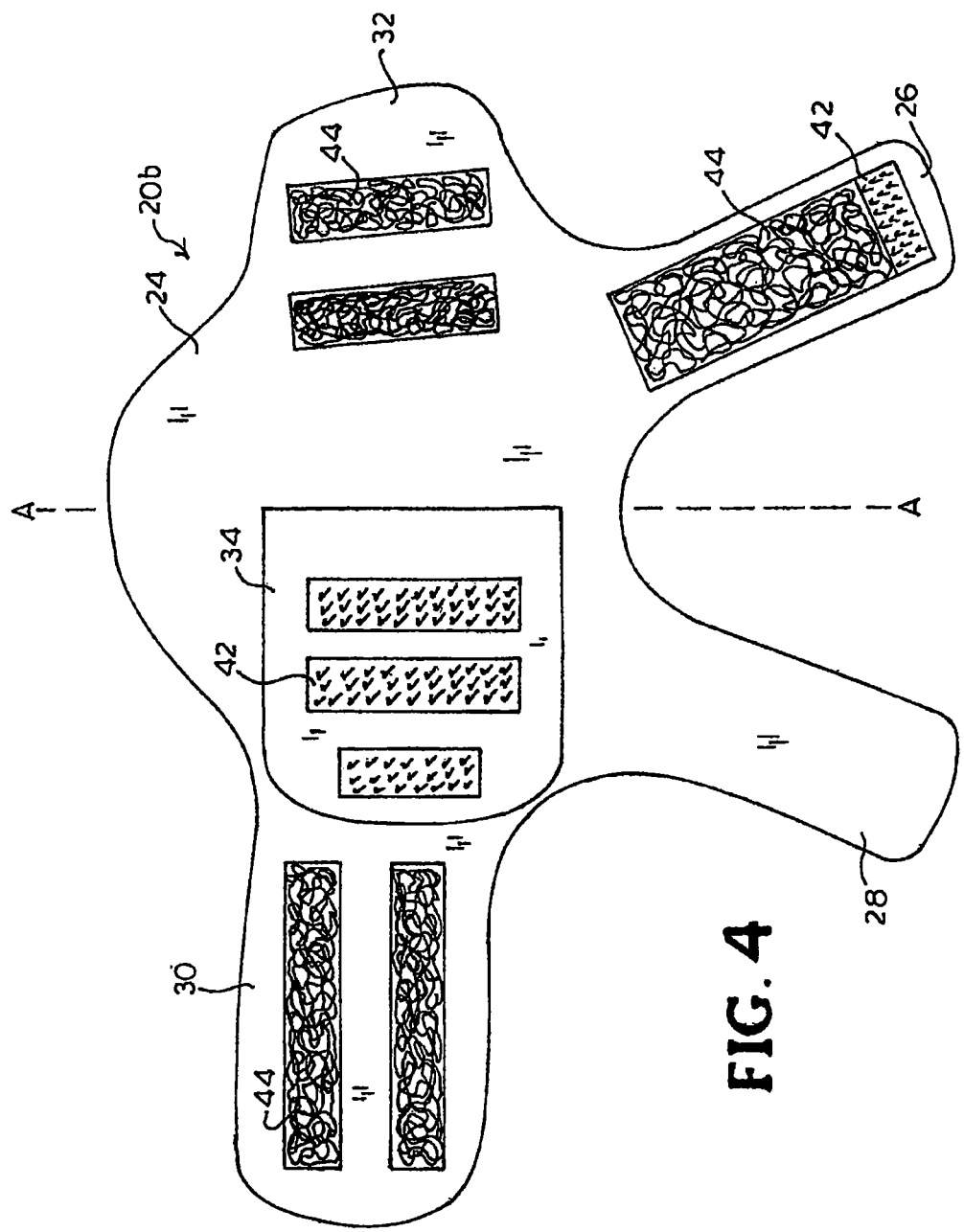
FIG. 4 is a top plan view of a second embodiment of the pressure-applying garment of FIG. 1.

FIGS. 4 and 5 show another embodiment of a pressure-applying garment 20b. The garment 20b is constructed similarly to the garment 20a of FIGS. 2 and 3, but includes on the left strap 26 on the top surface (FIG. 4) a portion near the end of the strap that is hook material 42, while on the bottom surface (FIG. 5) of the right strap 28 a portion that is loop material 44. Including both materials 42, 44 on the mating straps assist in maintaining the straps around the animal's neck without sagging. The embodiments of the garments 20a, 20b of FIGS. 2 and 3 and FIGS. 4 and 5 are further embodiments of the garment 20 embodiment of FIG. 1.

The material used for the garment 20 may have a composition that ranges, for example, from 5% to 25% spandex. The remainder of the material may be or include, for example, cotton and polyester. In one embodiment, the fabric may be made of 10% spandex, 55% cotton, and 35% polyester, or may be made of material of approximately that composition. Other fabrics and combinations of materials may be used as recognized by one of ordinary skill in the art, so long as the material exhibits a degree of elasticity that provides an expandable and flexible, yet snug, fit with pressure adequate to relieve anxiety, fearfulness, overexcitement, or a combination thereof, in the animal, and resilience that allows the material to return approximately to its original size when removed from the animal. In the embodiment of FIGS. 1-3, the central portion 24, straps 26, 28, long flap 30, and short flap 32 are made of one piece of material, with two layers sewn together continuously along the periphery. The cinching member 34 is sewn to the central portion 24 along one edge of the cinching member 34. One alternative configuration to the cinching member 34 may include the use of fabric straps, webbed straps, or elastic bands with clips or other connection means.

Figure 6A:
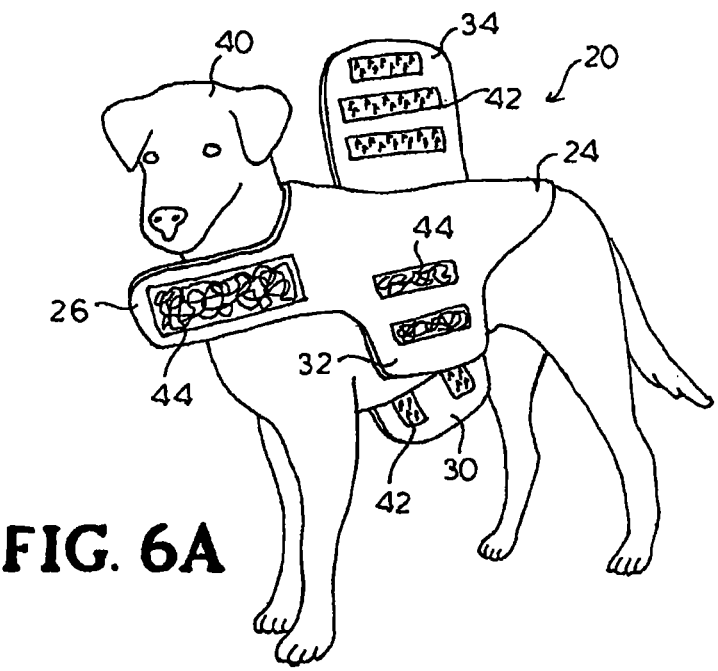
FIGS. 6A-6D are perspective views of the embodiment of FIG. 1 showing various stages of putting the garment on an exemplary animal.
Figure 6B:
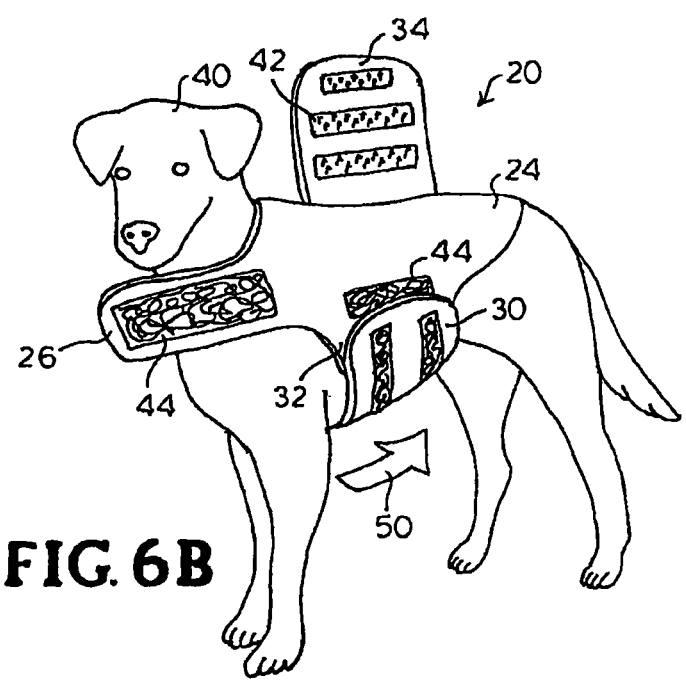
Figure 6C:
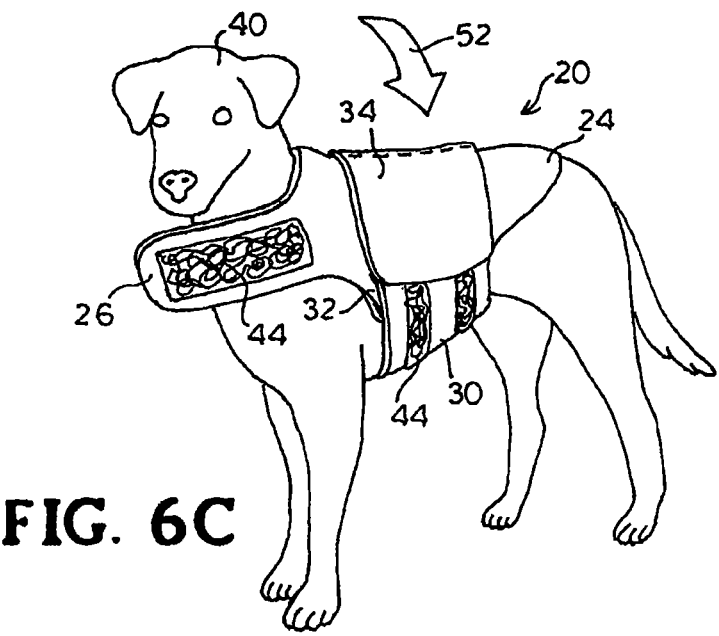
Figure 6D:
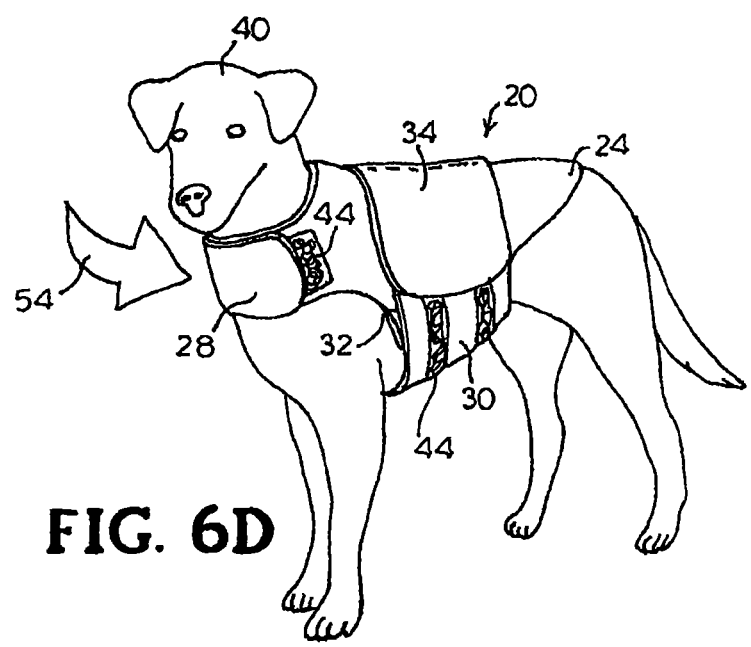

The garment 20 may be applied to an animal as shown in FIGS. 6A-6D. First, as shown in FIG. 6A, the garment 20 is placed on a back of the dog 40. Next, in FIG. 6B the long flap 30 is wrapped 50 under the dog's chest, stomach, and up the dog's left side and is secured with fasteners to the short flap 32 to achieve a comfortable, snug fit around the dog's mid-body, being the portion of the body between the dog's front and rear legs. The cinching member 34 is then wrapped 52 down onto the long flap 30 and is secured with fasteners in FIG. 6C, with some additional tension imparted on the garment to apply additional pressure to the dog, which will still be comfortable for the dog and give the dog a sense of security. As shown in FIG. 6D, the straps 26, 28 may then be wrapped 54 around the front of the dog 40 and secured with fasteners. If desired, the straps 26, 28 may be left attached when removing the garment 20 to save the step of fastening them the next time the garment 20 is put on the dog 40.

Although the embodiments described above have been shown and described in considerable detail with respect to only a few exemplary embodiments thereof, it should be understood by those skilled in the art that it is not intended to be limited to these embodiments since various modifications, omissions and additions may be made to the disclosed embodiments without materially departing from the novel teachings and advantages. The directions in which the flaps are folded could differ from those shown and the lengths of the flaps may vary. For example, the long flap 30 and the short flap 32 could be of equal length and fasten on top of the animal's back rather then on the lower side. The straps 26, 28, the cinching member 34, or both, may be omitted. Accordingly, it is intended to cover all such modifications, omission, additions and equivalents as may be included within the spirit and scope of a pressure-applying garment and associated methods as defined by the following claims. In the claims, means-plus-function clauses are intended to cover the structures described herein as performing the recited function and not only structural equivalents but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A garment for an animal having a first pair of appendages, a second pair of appendages, and a neck, the animal having a mid-body between the first pair of appendages and the second pair of appendages, the garment comprising:
   a central portion having a longitudinal axis and including a front end, a rear end opposite the front end, a first side extending laterally in a first side direction from the longitudinal axis, and a second side extending laterally in a second side direction from the longitudinal axis;
   a first flap extending from the first side of the central portion; and
   a second flap extending from the second side of the central portion;
   wherein the central portion, the first flap, or the second flap is made of a fabric that stretches,
   wherein each of the first flap and the second flap has an inside surface and an outside surface,
   wherein the outside surface of one of the first flap or the second flap includes at least one strip of hook fasteners or loop fasteners oriented in a first strip direction, and the inside surface of the other of the first flap or the second flap includes at least one strip of the other of the hook fasteners or the loop fasteners oriented in a second strip direction that is different than the first strip direction,
   wherein when the garment is worn by an animal the first flap and the second flap are configured to extend around the mid-body of the animal and fasten to each other such that the central portion and the first flap and the second flap fastened to each other form a shape conforming to the outside of the mid-body of the animal, and the front end of the central portion is positioned proximate to the neck of the animal, and
   wherein the garment, when worn, applies pressure to the animal adequate to reduce anxiety, fearfulness, overexcitement, or a combination thereof in the animal.

2. The garment of claim 1, wherein the central portion, the first flap, and the second flap are made of the fabric that when stretched provides resiliency adequate to reduce anxiety, fearfulness, overexcitement, or a combination thereof in the animal.

3. The garment of claim 1, wherein the fabric comprises from approximately 5% to 25% spandex, cotton, and polyester.

4. The garment of claim 1, wherein, when the garment is worn by the animal and the first and second flaps are fastened to each other, the first flap overlaps the second flap.

5. The garment as recited in claim 1,
wherein when the garment is worn by the animal and the first flap and the second flap are fastened together the hook fasteners and the loop fasteners are substantially adjacent to each other such that the first flap is fastened to the second flap.

6. The garment of claim 1, further comprising a cinching member having a proximate end attached to the central portion, the first flap, or the second flap and extending to a free distal end, wherein the cinching member is adapted to extend at least partially around the mid-body of the animal and to fasten to the central portion, the first flap, the second flap, or a combination thereof to further tighten the garment to apply pressure to the animal.

7. The garment of claim 6, wherein the cinching member is attached at the proximate end to the central portion along one edge of the cinching member generally along the longitudinal axis of the central portion.

8. The garment of claim 6, wherein when the cinching member is fastened to the central portion, the first flap, the second flap, or a combination thereof, the cinching member overlaps and extends past the first flap.

9. The garment of claim 6, wherein the cinching member has opposed longitudinal edges, and wherein the cinching member has a width that is along a distance parallel to the longitudinal axis of the garment between the opposing longitudinal edges of the cinching member, and wherein the width of the cinching member extends along the longitudinal axis more than one half of a distance between the front end and the rear end of the central portion.

10. A garment for an animal having a first pair of appendages, a second pair of appendages, and a neck, the animal having a mid-body between the first pair of appendages and the second pair of appendages, the garment comprising:
a central portion having a longitudinal axis and including a front end, a rear end opposite the front end, a first side extending laterally in a first side direction from the longitudinal axis, and a second side extending laterally in a second side direction from the longitudinal axis; and
a first flap extending from the first side of the central portion; and
a second flap extending from the second side of the central portion;
a cinching member having a proximal end attached to the central portion, the first flap, or the second flap and extending to a free distal end,
wherein the central portion, the first flap, the second flap or the cinching member is made of a fabric that stretches,
wherein each of the first flap, the second flap, and the cinching member has an inside surface and an outside surface, wherein the outside surface of one of the first flap or the second flap includes at least one strip of hook fasteners or loop fasteners oriented in a first strip direction, the inside surface of the other of the first flap or the second flap includes at least one strip of the other of the hook fasteners or the loop fasteners oriented in a second strip direction that is different than the first strip direction, and the inside surface of the cinching member has at least one of hook fasteners or loop fasteners,
wherein when the garment is worn by the animal the first flap and the second flap are configured to extend around the mid-body of the animal and fasten to each other such that the central portion and the first flap and the second flap fastened to each other form a shape conforming to the outside of the mid-body of the animal, and
wherein the cinching member is configured to extend at least partially around the shape formed by the central portion and the first flap and the second fastened to each other that conforms to the mid-body of the animal and fastens to the central portion, the first flap, the second flap, or a combination thereof, and the front end of the central portion is positioned proximate to the neck of the animal, and the garment, when worn, applies pressure to the animal adequate to reduce anxiety, fearfulness, overexcitement, or a combination thereof in the animal.

11. The garment of claim 10, wherein the cinching member is attached at the proximal end to the central portion along one edge of the cinching member generally along the longitudinal axis of the central portion.

12. The garment of claim 10, wherein the central portion, the first flap, and the second flap are made of the fabric that when stretched provides resiliency adequate to reduce anxiety, fearfulness, overexcitement, or a combination thereof in the animal.

13. The garment of claim 12, wherein the fabric comprises from approximately 5% to 25% spandex, cotton, and polyester.

14. The garment as recited in claim 10,
wherein when the garment is worn by the animal and the first flap and the second flap are fastened together the hook fasteners and the loop fasteners are substantially adjacent to each other such that the first flap is fastened to the second flap.

15. The garment as recited in claim 14, wherein when the garment is worn by the animal and the first flap and the cinching member are fastened together the hook fasteners and the loop fasteners are substantially adjacent to each other such that the first flap is fastened to the cinching member.

16. The garment of claim 10, wherein the cinching member has opposing edges, and wherein the cinching member has a primary width that is along a distance parallel to the longitudinal axis of the garment between the opposing edges of the cinching member, and wherein the primary width of the cinching member extends along the longitudinal axis more than one half of a distance between the front end and the rear end of the central portion.

17. A method of reducing anxiety, fearfulness, overexcitement, or a combination thereof, in an animal, the animal having a first pair of appendages, a second pair of appendages, a neck, a chest, and a stomach, the animal having a mid-body between the first pair of appendages and the second pair of appendages, the method comprising the steps of:
placing a garment on the mid-body of the animal, the garment including:
a central portion having a longitudinal axis and including a front end positioned proximate to the neck of the animal, a rear end opposite the front end, a first side extending laterally in a first side direction from the longitudinal axis, and a second side extending laterally in a second side direction from the longitudinal axis,
a first flap extending from the first side of the central portion; and
a second flap extending from the second side of the central portion;
wherein the central portion, the first flap, or the second flap is made from a stretchable fabric;
wrapping the first flap around the chest, the stomach, or a combination thereof of the animal to overlap the second flap;
stretching the garment prior to securing the first flap to the second flap; and
securing the first flap to the second flap, wherein each of the first flap and the second flap has an inside surface and an outside surface, wherein the outside surface of one of the first flap or the second flap includes at least one strip of hook fasteners or loop fasteners oriented in a first strip direction, and the inside surface of the other of the first flap or the second flap includes at least one strip of the other of the hook fasteners or the loop fasteners oriented in a second strip direction that is different than the first strip direction, and
wherein the stretchable fabric forming the central portion, the first flap, or the second flap provides resiliency when stretched such that the garment applies pressure to the animal adequate to reduce anxiety, fearfulness, overexcitement, or any combination thereof in the animal.

18. The method of claim 17, wherein the garment further comprises a cinching member comprising a stretchable fabric and having a proximate end attached to the central portion, the first flap, or the second flap and extending to a free distal end, and
further comprising the step of wrapping the cinching member such that the distal end overlaps the first flap proximate to where the first flap is secured to the second flap; and
securing the cinching member to the central portion, the first flap, the second flap, or a combination thereof to increase the pressure on the animal,
wherein the stretchable fabric forming the central portion, the first flap, the second flap, and the cinching member provides resiliency when stretched such that the garment applies pressure to the animal adequate to reduce anxiety, fearfulness, overexcitement, or any combination thereof in the animal.

19. A garment for an animal having a first pair of appendages, a second pair of appendages, and a neck, the animal having a mid-body between the first pair of appendages and the second pair of appendages, the garment comprising:
a central portion having a longitudinal axis and including a front end, a rear end opposite the front end, a first side extending laterally in a first side direction from the longitudinal axis, and a second side extending laterally in a second side direction from the longitudinal axis;
a first flap extending from the first side of the central portion;
a second flap extending from the second side of the central portion; and
a cinching member having a proximal end attached to the central portion along the longitudinal axis of the central portion and extending to a free distal end, the cinching member having opposed longitudinal edges and a primary width extending between and perpendicular to the longitudinal edges, wherein the primary width of the cinching member is more than one half of a distance between the front end and the rear end of the central portion,
wherein the central portion, the first flap, or the second flap is made of a fabric that stretches; and
wherein when the garment is worn by the animal the first flap and the second flap extend around the mid-body of the animal and fasten to each other such that the central portion with the fastened first and second flaps form a shape conforming to the outside of the mid-body of the animal, and the cinching member extends at least partially around the shape formed by the central portion with the fastened first and second flaps and fastens to the central portion.

20. The garment of claim 19, wherein the central portion, the first flap, and the second flap are made of the fabric that when stretched provides resiliency adequate to reduce anxiety, fearfulness, overexcitement, or a combination thereof in the animal.

21. The garment of claim 20, wherein the fabric comprises from approximately 5% to 25% spandex, cotton, and polyester.

22. The garment as recited in claim 19, wherein each of the first flap, the second flap, and the cinching member has an inside surface and an outside surface, wherein the outside surface of one of the first flap, or the second flap, includes hook fasteners or loop fasteners, and the inside surface of the other of the first flap or the second flap includes the other of the hook fasteners or the loop fasteners, wherein the inside surface of the cinching member has at least one of hook fasteners or loop fasteners, and
wherein when the garment is worn by the animal and the first flap and the second flap are fastened together, the hook fasteners and the loop fasteners are substantially adjacent to each other such that the first flap is fastened to the second flap.

23. The garment as recited in claim 22, wherein when the garment is worn by the animal and the first flap and the cinching member are fastened together the hook fasteners and the loop fasteners are substantially adjacent to each other such that the first flap is fastened to the cinching member.

* * * * *